Sept. 6, 1955

R. F. SMITH 2,716,933

MASTER IMPLEMENT AND TOOL CARRYING BEAM

Filed May 20, 1952

INVENTOR.
Roy F. Smith,
BY Victor J. Evans & Co.
ATTORNEYS

Sept. 6, 1955

R. F. SMITH 2,716,933

MASTER IMPLEMENT AND TOOL CARRYING BEAM

Filed May 20, 1952

INVENTOR.
Roy F. Smith,
BY Victor J. Evans & Co.
ATTORNEYS

INVENTOR.
Roy F. Smith,
BY Victor J. Evans & Co.
ATTORNEYS

Sept. 6, 1955      R. F. SMITH      2,716,933
MASTER IMPLEMENT AND TOOL CARRYING BEAM
Filed May 20, 1952      4 Sheets-Sheet 4
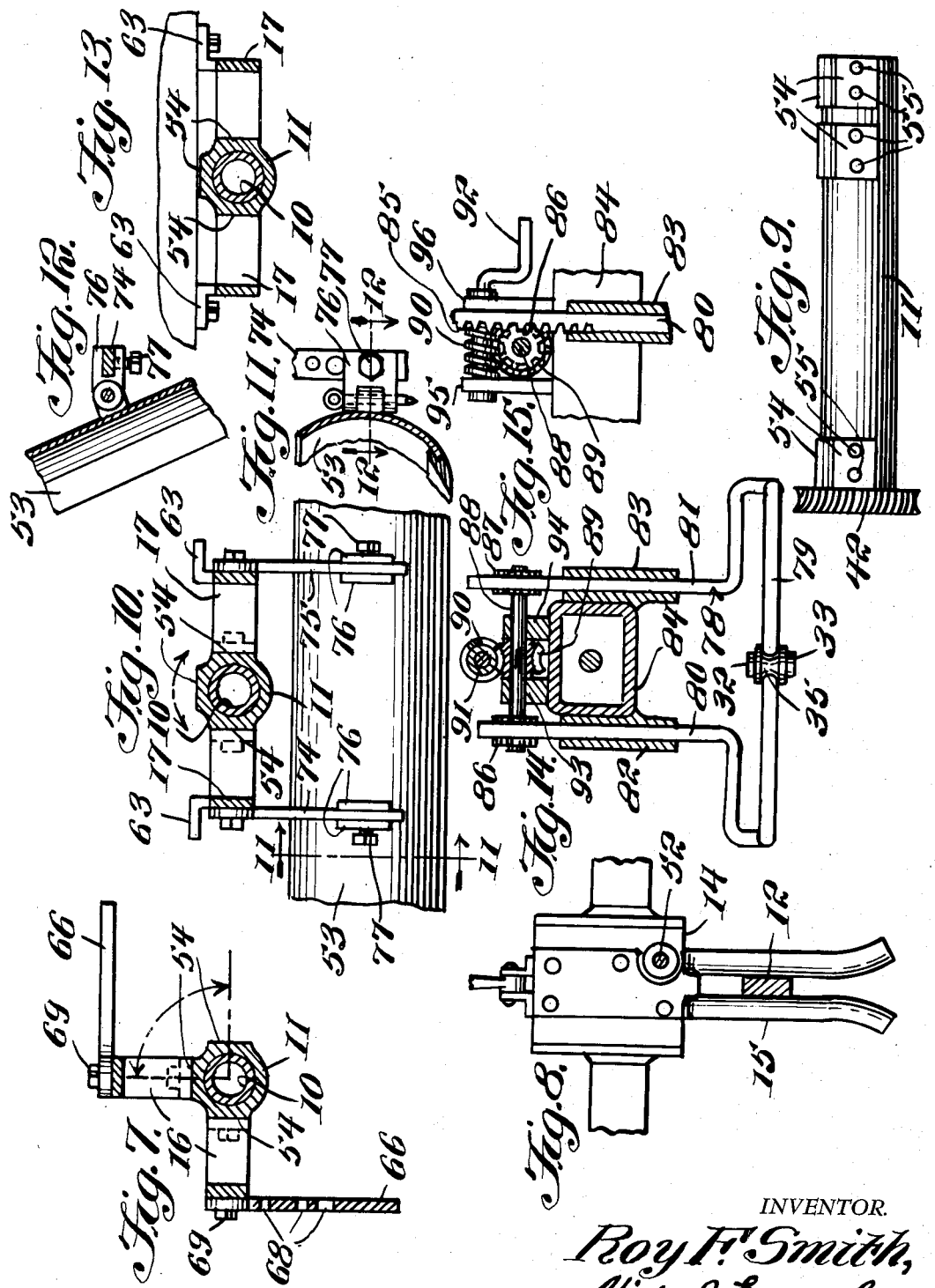
INVENTOR.
Roy F. Smith,
BY Victor J. Evans & Co.
ATTORNEYS United States Patent Office 2,716,933
Patented Sept. 6, 1955

2,716,933

MASTER IMPLEMENT AND TOOL CARRYING BEAM

Roy F. Smith, Silt, Colo.

Application May 20, 1952, Serial No. 288,857

1 Claim. (Cl. 97—26)

This invention relates to attachments for mounting implements, tools and the like on a tractor, and in particular a beam for use on a tractor with different types of brackets and implement mounting elements thereon whereby the same beam may be used for discs, plows, and other types of ground working and earth moving elements.

The purpose of this invention is to provide an attachment to which different types of tools, implements, and the like may be attached and in which the tools, implements and the like may be readily adjusted to different positions.

Various types of attachments have been provided for mounting plows, cultivators, and other implements on tractors, however, with the conventional type of attachment a different unit is required for each type of tool or implement, and attachments of this type are comparatively costly. With this thought in mind this invention contemplates an attachment in the form of a master beam that may readily be attached to a tractor and upon which various types of tools and implements may be mounted.

The object of this invention is, therefore, to provide a master beam for mounting a plurality of tools, implements, and the like on a tractor.

Another object of the invention is to provide a master beam for attaching tools and implements to a tractor in which changes are not required in the tractor or tools and implements whereby conventional tools and implements may be secured to the attachment.

A further object of the invention is to provide a master beam for securing a plurality of devices to a tractor in which the beam is of a simple and economical construction.

With these and other objects and advantages in view the invention embodies an elongated cylindrical beam having means on one end for attaching the beam to a tractor and having a wheel mounted on the opposite end and controlled by a hydraulic cylinder, a sleeve journaled on the beam and adapted to be rotated to tilt tools and other implements carried by the beam, and laterally disposed brackets mounted on the sleeve and having bolt holes and other devices therein to provide mounting means for tools and other implements and the like.

Other features and advantages of the invention will appear from the following description taken in connection with the drawings, wherein:

Figure 4 is a detail illustrating a tool mounting bracket adapted to be attached to one side of the sleeve rotatably mounted on the beam and showing a modification wherein the rear end of the bracket is diagonally positioned.

Figure 5 is a detail showing the mounting bracket as illustrated in Fig. 3, with other parts omitted.

Figure 6 is a section taken on line 6—6 of Fig. 1 showing a worm and gear mounted in a yoke, for rotating the sleeve on the beam by the power take off of a tractor to which the beam is connected, and in which the yoke is shown in section.

Figure 7 is a typical cross section through the beam, taken substantially on line 7—7 of Fig. 2 illustrating arms for attaching tools and other implements to the beam.

Figure 8 is a cross section taken on line 8—8 of Fig. 1 illustrating a fork depending from the tractor housing and in which a flat section of the beam is positioned.

Figure 9 is a detail illustrating the sleeve mounted on the beam and showing the position of bosses thereon by means of which tools and implements are attached to the sleeve.

Figure 10 is a cross section through the beam, taken substantially on line 10—10 of Fig. 3 illustrating a method of attaching a scraper blade to the beam.

Figure 11 is a cross section through the blade taken on line 11—11 of Fig. 10.

Figure 12 is a sectional plan through the blade mounting elements taken on line 12—12 of Fig. 11.

Figure 13 is a cross section through the beam and mounting elements substantially similar to Fig. 10 with the blade and mounting arms thereof omitted.

Figure 14 is a cross section illustrating a modification and showing manually actuated means for operating a yoke with which the forward end of the beam is attached to the tractor housing.

Figure 15 is a detail showing a longitudinal section through the yoke mounting shown in Fig. 14.

Figure 1:
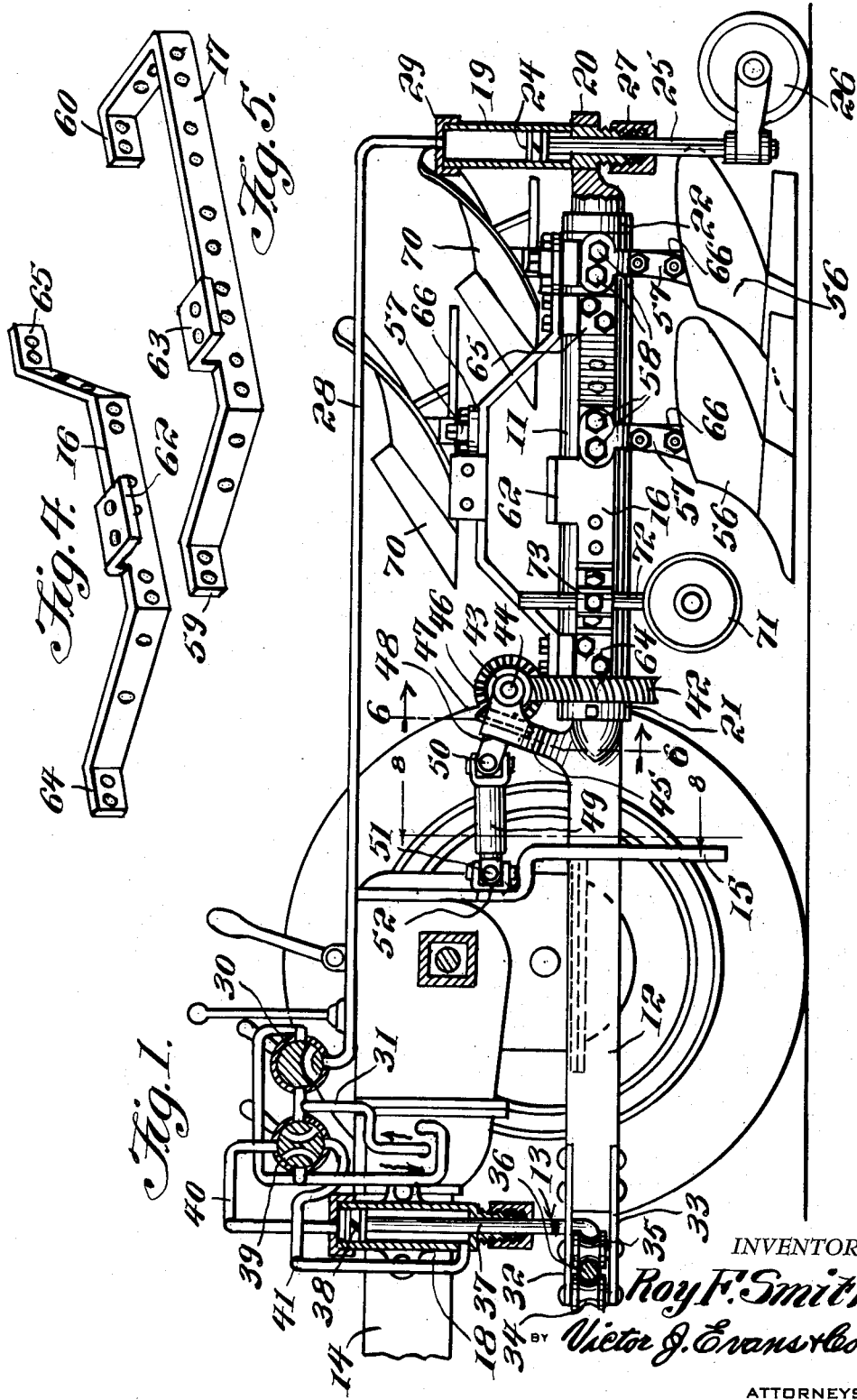
Figure 1 is a side elevational view illustrating the improved master beam with control cylinders at the ends shown in section.

Referring now to the drawings wherein like reference characters denote corresponding parts the master beam of this invention includes a tubular section 10 having a sleeve 11 rotatably mounted thereon and having a tongue 12 extended from the forward end, a yoke 13 for attaching the forward end of the beam to a tractor housing as indicated by the numeral 14, a fork 15 providing a guide, brackets 16 and 17 adapted to be attached to sides of the sleeve 11 and hydraulic cylinders 18 and 19 for adjusting the ends of the beams vertically.

The cylindrical section 10 of the master beam extends from the tongue 12 to a hub 20 in which the cylinder 19 is mounted and the sleeve 11 is positioned between collars 21 and 22 which are secured in position with set screws 23.

The cylinder 19 is provided with a piston 24 from which a piston rod 25 having a wheel 26 on the lower end extends, the piston rod passing through a packing gland 27. The cylinder 19 is supplied with fluid under pressure through a tube 28 which extends from a cap 29 to a valve 30 and the valve is connected to a pump or other fluid pressure device on the tractor by a tube 31.

The end of the tongue 12 providing the opposite end of the beam is provided with plates 32 and 33 between which rollers 34 and 35 are mounted and the rollers are positioned to travel over the arcuate section 36 of the yoke 13. The yoke is provided with upwardly extended ends 37 which provide piston rods for pistons 38 in the cylinders 18.

The cylinders 18 are provided with fluid under pressure from the connection 31 through a valve 39 and a tube 40. The return of the cylinders is carried back to the valve through tubes 41.

With the parts arranged in this manner it will be noted that the master beam pivots about the guide fork 15 with the inner end supported by the yoke 13 and the outer end on the wheel or roller 26. The beam may be secured in adjusted positions by suitable means.

The sleeve 11 is illustrated in detail in Fig. 9 is provided with a worm gear 42 that meshes with a worm 43 on a shaft 44 that is journaled in a yoke 45 which extends upwardly from the tongue 12 and the worm is driven by the power take off of the tractor through beveled gears 46 and 47, the gear 46 being mounted on the shaft 44 and the gear 47 on a section 48 of a telescoping shaft 49 that is provided with universal joints 50 and 51 and that is connected to the power take off 52 of the tractor. The shaft 44 is provided with an extended end 53 which is formed with flat sides or splines providing a drive for implements attached to or used in combination with the master beam. By this means the sleeve 11 may be rotated on the beam to tilt a scraper blade, such as the blade 53 to correspond with the grade or slope of a road, or the like.

The sleeve 11 is also provided with bosses 54 having bolt holes 55 therein and moldboard plows such as the plows 56 may be bolted to the sleeve with supports 57, the upper ends of the supports being secured to the bosses with bolts 58.

Figure 3:
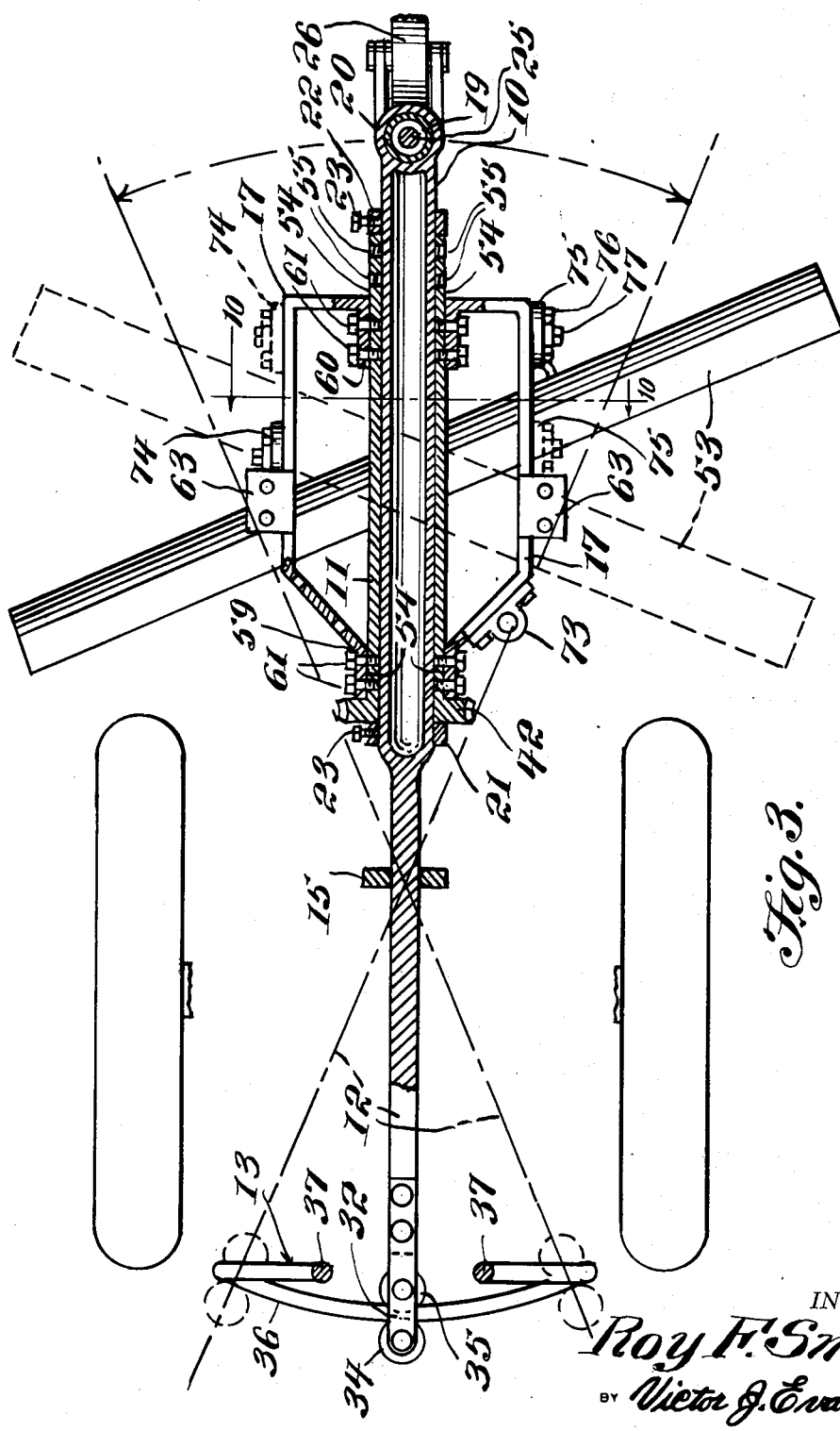
Figure 3 is a sectional plan through the intermediate portion of the beam showing a scraper blade carried by the beam and indicating the rear wheels of a tractor upon which the beam is mounted.

The plows may also be secured to the master beam by brackets, such as the brackets 16 and 17 and, in Fig. 3, the master beam is provided with a bracket 17 on each side and the plow supports 57 may be secured to the brackets with bolts 58.

The brackets 17 are provided with flanges 59 and 60 and bolts 61 extended through bolt holes in the flanges may be threaded into the sleeve, as illustrated in Fig. 3.

The brackets 16 and 17 may also be provided with supporting flanges 62 and 63, respectively, and implements or other devices may be bolted to the flanges.

Figure 2:
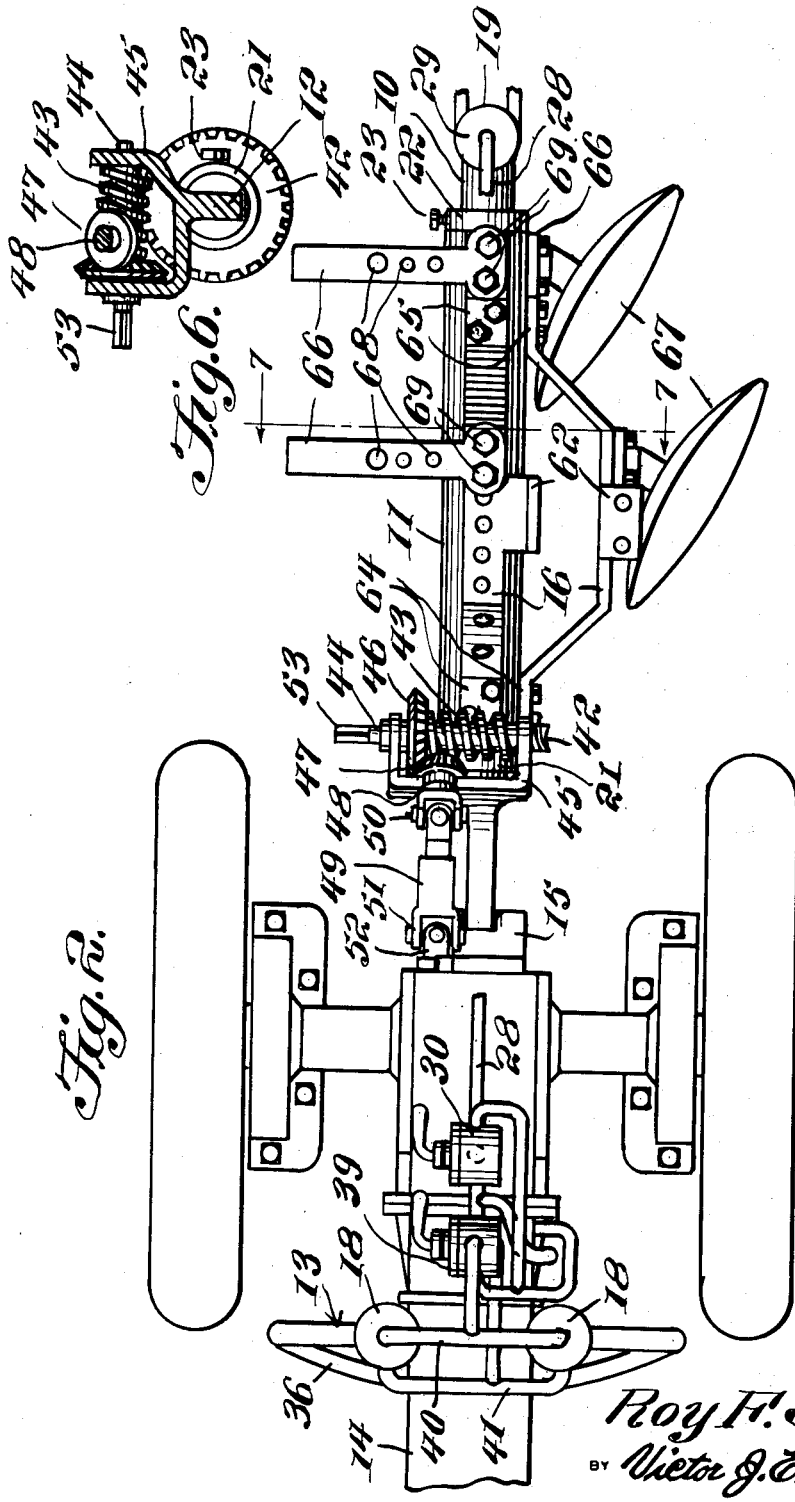
Figure 2 is a plan view of the beam, showing the beam mounted on a tractor, the forward part of the tractor being broken away.

The bracket 16, as illustrated in detail in Fig. 4 and also shown in Fig. 2 is also provided with flanges at the ends such as the flanges 64 and 65 and this bracket may be secured to the sleeve with bolts extended through bolt holes in the flanges, as shown in Fig. 2.

The master beam is also provided with arms, such as the arms 66 which are particularly adapted for mounting discs 67 on the master beam and, as illustrated in Fig. 2 the arms 66 are provided with bolt holes 68.

The arms 66 are secured to bosses 54 on the sleeve 11 or to the brackets 16 and 17 with bolts 69 or other fastening means.

As illustrated in Fig. 1 the master beam may be provided with plows, such as the moldboard plows 56 on one side and with plows, such as the plows 70 on another side, and one set of plows may be positioned in the same plane as the plows of another set or one set may be positioned in a plane perpendicular to a plane extended through the plows of another set. By this means plows on one side of the beam may be used for plowing in one direction and by rotating the sleeve through the worm and gear from the power take off of the tractor the plows of the other set may be dropped into operative position and with one set of plows positioned opposite to the other, one set will plow in one direction and the other in the opposite direction.

It will also be understood that different types of plows may be mounted on the master beam whereby the device may be used for different types of plowing.

In Figs. 1 and 3 a disc 71 is suspended by a rod 72 from a bearing or clamp 73 on one of the brackets 17 and it will be understood that discs or other tools or implements may be attached to the master beam or brackets thereof whereby the master beam is adapted for universal use.

Also as illustrated in Figs. 3 and 10 a scraper blade such as the blade 53 may be secured by supporting arms 74 and 75 to brackets, such as the bracket 17, the lower end of the arms being secured between ears 76 with bolts 77.

As illustrated in Figs. 14 and 15 the yoke 13 is replaced with a yoke 78 having an arcuate section 79, similar to the section 36 of the yoke 13 and having upwardly extended sections 80 and 81 which are slidably mounted in bearings 82 and 83, respectively on the sides of a tractor housing 84

The sections 80 and 81 are provided with teeth 85 providing gear racks and the gear racks are positioned to mesh with pinions 86 and 87 on a shaft 88 which is provided with a worm gear 89 that meshes with a worm 90 on a shaft 91, one end of which is provided with a hand crank 92. The shaft 88 is journaled in bearings 93 and 94 and the shaft 91 in bearings 95 and 96. By this means the hand crank 92 may be turned to raise and lower the yoke 78 in order to adjust the position of the master beam and tools or implements carried thereby.

Tools, implements, or other devices may be directly attached to the master beam or to the brackets on the sides thereof or the brackets may be used as spacing elements whereby implements such as gang discs or plows may be carried by the master beam.

It will also be understood that other modifications, within the scope of the appended claim, may be made in the design and arrangement of the parts without departing from the spirit of the invention.

What is claimed is:

In a master beam for mounting farm implements on a tractor, the combination which comprises an elongated tubular section having a tongue extended from the forward end and having a hub, the axis of which is vertically positioned on the trailing end, a sleeve having flat upper and side surfaces rotatably mounted on said tubular section, said sleeve having threaded bolt-receiving openings in said flat surfaces and also having a worm gear on the forward end, a bracket having a bar parallel to and spaced from the sleeve adapted to be bolted to the sleeve through a flange on a diagonally disposed section at the forward end and also through a flange on a right angularly disposed section at the opposite end, said bracket being adapted to have a farm implement attached thereto, means for connecting the forward end of the tongue to a tractor, a worm mounted on the tongue and positioned in meshing relation with said worm gear, means for, selectively, actuating said worm by the power take-off of the tractor or with a hand crank, a wheel pivotally mounted in the hub on the trailing end of said cylindrical section of the beam, a yoke having a horizontally disposed lower section mounted on the tractor housing, rollers rotatably mounted on the tongue and positioned to travel on the lower portion of said horizontally disposed lower section, and a fork mounted on the tractor housing and positioned to receive said tongue, said fork being positioned between the yoke and forward end of the tubular section of the beam whereby upon lateral movement of the forward end of the tongue in one direction the trailing end thereof moves laterally in the opposite direction.

References Cited in the file of this patent

UNITED STATES PATENTS

| | | |
|---|---|---|
| 120,572 | Chapman | Nov. 7, 1871 |
| 156,123 | Bieker | Oct. 20, 1874 |
| 536,949 | Fay | Apr. 2, 1895 |
| 1,517,086 | Mattice | Nov. 25, 1924 |
| 1,578,084 | Neufang | Mar. 23, 1926 |
| 1,695,522 | Benjamin | Dec. 18, 1928 |
| 2,426,548 | Capon | Aug. 26, 1947 |
| 2,611,301 | Ego | Sept. 23, 1952 |
| 2,625,091 | Pursche | Jan. 13, 1953 |

FOREIGN PATENTS

| | | |
|---|---|---|
| 938,362 | France | Apr. 5, 1948 |
| 973,111 | France | Sept. 6, 1950 |
| 989,046 | France | May 16, 1951 |